United States Patent
Aki

(10) Patent No.: US 9,115,983 B2
(45) Date of Patent: Aug. 25, 2015

(54) POSITION MEASUREMENT APPARATUS AND POSITION MEASURING METHOD

(75) Inventor: Tomohiko Aki, Tsukubamirai (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 665 days.

(21) Appl. No.: 12/813,927

(22) Filed: Jun. 11, 2010

(65) Prior Publication Data

US 2011/0007155 A1      Jan. 13, 2011

(30) Foreign Application Priority Data

Jul. 7, 2009   (JP) ................. 2009-160860

(51) Int. Cl.
*H04N 7/18*      (2006.01)
*G01B 11/02*     (2006.01)

(52) U.S. Cl.
CPC ..................... *G01B 11/02* (2013.01)

(58) Field of Classification Search
CPC ............. G01B 11/02; H04N 7/18; H04N 7/00
USPC ................. 348/135, 142, 148, 149; 340/146; 382/46, 61, 104, 284, 294, 106, 3.06, 382/103, 145, 299; 83/13; 356/3.06; 702/127; 353/70
See application file for complete search history.

(56) References Cited

U.S. PATENT DOCUMENTS

| | | | |
|---|---|---|---|
| 4,424,587 A * | 1/1984 | Wevelsiep et al. ............ 382/289 |
| 5,729,216 A * | 3/1998 | Sasaki et al. .................. 340/937 |
| 5,808,726 A * | 9/1998 | Egawa et al. ................. 356/3.06 |
| 6,164,174 A * | 12/2000 | Sigurdsson et al. .............. 83/13 |
| 6,642,506 B1 | 11/2003 | Nahum et al. |
| 7,466,336 B2 * | 12/2008 | Regan et al. .................... 348/50 |
| 7,729,516 B2 * | 6/2010 | Shima et al. .................. 382/106 |
| 7,925,328 B2 * | 4/2011 | Urquhart et al. .............. 600/429 |
| 2004/0133298 A1 * | 7/2004 | Toyserkani et al. ........... 700/166 |
| 2004/0141157 A1 * | 7/2004 | Ramachandran et al. ...... 353/70 |

(Continued)

FOREIGN PATENT DOCUMENTS

| | | | |
|---|---|---|---|
| CN | 101248409 A | 8/2008 |
| GB | 2 383 411 B | 11/2005 |

(Continued)

OTHER PUBLICATIONS

Office Action issued May 3, 2012 in Chinese Application No. 201010230921.9 (With English Translation).

(Continued)

*Primary Examiner* — Y Lee
*Assistant Examiner* — Salame Amr
(74) *Attorney, Agent, or Firm* — Oblon, McClelland, Maier & Neustadt, L.L.P.

(57) ABSTRACT

In a position measurement apparatus and a positioning measuring method, an image capturing element having an imaging region of a dimension smaller than that of a workpiece is moved relatively over a surface of the workpiece while an image on the surface of the workpiece is captured. In addition, a pattern on the surface of the workpiece is extracted from an image (I(t)) inside the imaging region, and a displacement amount of the pattern occurring in the image (I(t+1)) inside the imaging region is detected. A position on the surface of the workpiece is measured based on the detected displacement amount and the dimension.

16 Claims, 13 Drawing Sheets

(56) References Cited

U.S. PATENT DOCUMENTS

| | | | |
|---|---|---|---|
| 2005/0013475 A1* | 1/2005 | Levin et al. | 382/145 |
| 2006/0122804 A1* | 6/2006 | Chang et al. | 702/127 |
| 2006/0159369 A1* | 7/2006 | Young | 382/299 |
| 2007/0291992 A1* | 12/2007 | Shima et al. | 382/106 |
| 2008/0078933 A1* | 4/2008 | Watanabe et al. | 250/307 |
| 2010/0111370 A1* | 5/2010 | Black et al. | 382/111 |
| 2010/0166256 A1* | 7/2010 | Kmiecik et al. | 382/103 |
| 2010/0272321 A1 | 10/2010 | Kimura et al. | |

FOREIGN PATENT DOCUMENTS

| | | |
|---|---|---|
| JP | 2002-13948 | 1/2002 |
| JP | 2003-148918 | 5/2003 |
| JP | 2005-172667 | 6/2005 |
| JP | 2007-303994 | 11/2007 |
| WO | WO 2007/024085 A1 | 3/2007 |
| WO | WO2009/088053 | 7/2009 |

OTHER PUBLICATIONS

Office Action issued on Dec. 22, 2011 in the corresponding Korean Patent Application No. 10-2010-0063455 (with the English translation of pertinent portion).

Office Action issued on Jan. 10, 2012 in the corresponding Japanese Patent Application No. 2009-160860 (with the English translation of pertinent portion).

* cited by examiner

POSITION MEASUREMENT APPARATUS AND POSITION MEASURING METHOD

CROSS-REFERENCE TO RELATED APPLICATION

This application is based upon and claims the benefit of priority from Japanese Patent Application No. 2009-160860 filed on Jul. 7, 2009, of which the contents are incorporated herein by reference.

BACKGROUND OF THE INVENTION

1. Field of the Invention

The present invention relates to a position measurement apparatus and a position measuring method for measuring a position on the surface of a measurement object by capturing an image of the surface of the measurement object.

2. Description of the Related Art

For measuring the length of a measurement object (in the present specification, this is referred to as the total length of the measurement object, the size of a part thereof, or the displacement, etc., of the measurement object), an image capturing position measurement apparatus has been used. Such a position measurement apparatus captures an optical image irradiated from the surface of the measurement object using an image sensor made up of a CCD, CMOS image sensor array or the like, and analyzes the image signal obtained by such image capturing to thereby measure the length of the measurement object.

For example, in Japanese Laid-Open Patent Publication No. 2002-013948 and in Japanese Laid-Open Patent Publication No. 2003-148918, systems are disclosed in which an imaging region with respect to a measurement object is set narrowly, so that displacement of the measurement object can be measured at high resolution and with high accuracy.

However, even when such an image capturing displacement measurement apparatus is used, in the case that the length of a measurement object having a large measurement range is to be measured, because a trade off relationship occurs between the size of the measurement range and spatial resolution, various difficulties in measurement tend to occur. Specifically, when the image capturing magnification ratio is small, although the entire measurement object can be set inside of the imaging region, on the other hand, since the imaging spatial resolution is decreased, sufficient measurement accuracy cannot be obtained.

Further, when the image capturing magnification ratio is made larger, although good measurement accuracy can be obtained because imaging spatial resolution is improved, the entire measurement object cannot be set inside of the imaging region. Stated otherwise, this is because the imaging region and spatial resolution are finite since there is a limit imposed on the capacity of the image sensor and the configuration of the apparatus.

On the other hand, although it can be considered to increase the number of pixels that make up the image sensor and to provide a configuration having a large imaging region, this will make the position measurement apparatus large in scale and drastically increase manufacturing costs thereof.

SUMMARY OF THE INVENTION

A general object of the present invention is to provide a position measurement apparatus and position measuring method in which an increase in size and rise in manufacturing costs of the apparatus are prevented, while also enabling the length of a measurement object to be measured, even in the case that the measurement range of the measurement object is either narrower or wider compared with the imaging region.

The present invention is characterized by a position measurement apparatus, in which an image capturing element having an imaging region of a dimension smaller than that of a measurement object is moved relatively over a surface of the measurement object while an image on the surface of the measurement object is captured to obtain an image inside the imaging region, and a position on the surface of the measurement object is measured using the obtained image inside the imaging region. The position measurement apparatus comprises an extracting unit for extracting a pattern on the surface of the measurement object from the image inside the imaging region at a predetermined point in time, a detector for detecting a displacement amount of the pattern extracted by the extracting unit occurring in the image inside the imaging region at a point in time after the predetermined point in time, and a measurement unit for measuring the position on the surface of the measurement object based on the dimension and the displacement amount detected by the detector.

According to the present invention, because the extracting unit for extracting a pattern on the surface of the measurement object and a detector for detecting a displacement amount of the pattern occurring in the image inside the imaging region are provided, while the image sensor is moved relatively over the surface of the measurement object which is larger than the imaging region of the image sensor, the relative positional relationship between the measurement object and the imaging region is capable of being grasped based on the displacement amount of the pattern both within and outside of the imaging region. Hence, even in the case that the measurement range of the measurement object is either narrower or wider compared with the imaging region, the position on the surface of the measurement object can be measured.

The present invention is further characterized by a position measuring method, in which an image capturing element having an imaging region of a dimension smaller than that of a measurement object is moved relatively over a surface of the measurement object while an image on the surface of the measurement object is captured to obtain an image inside the imaging region, and a position on the surface of the measurement object is measured using the obtained image inside the imaging region. The method comprises the steps of extracting a pattern on the surface of the measurement object from the image inside the imaging region at a predetermined point in time, detecting a displacement amount of the pattern extracted by an extracting unit occurring in the image inside the imaging region at a point in time after the predetermined point in time, and measuring the position on the surface of the measurement object based on the dimension and the displacement amount detected by a detector.

According to the present invention, because steps are provided for extracting a pattern on the surface of the measurement object and detecting the displacement amount occurring in the image inside the imaging region, while the image sensor is moved relatively over the surface of the measurement object which is larger than the imaging region of the image sensor, the relative positional relationship between the measurement object and the imaging region is capable of being grasped based on the displacement amount of the pattern both within and outside of the imaging region, and hence, even in the case that the measurement range of the measurement object is either narrower or wider compared with the imaging region, the position on the surface of the measurement object can be measured.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
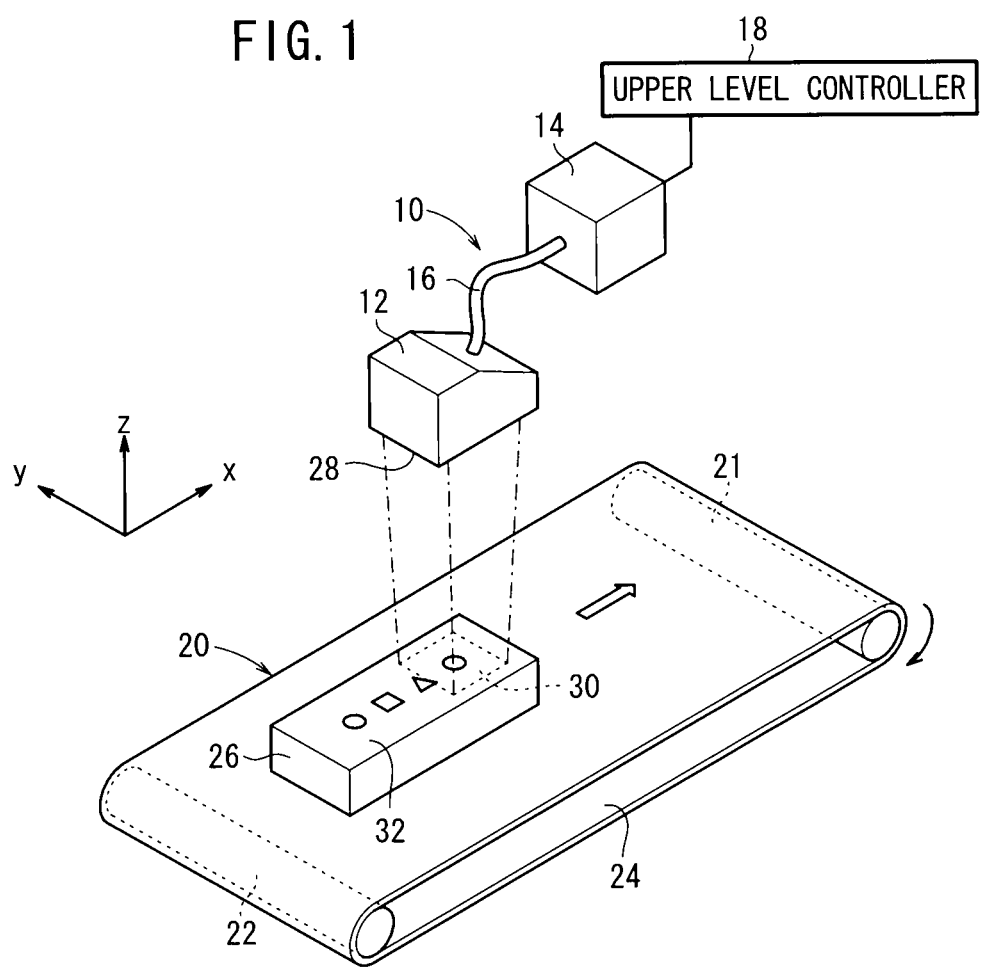
FIG. 1 is an outline perspective view of a position measurement apparatus according to an embodiment of the present invention.

As shown in FIG. 1, the position measurement apparatus 10 is equipped with a sensor head 12 that captures an optical image irradiated from a surface of a measurement object, an image processor 14 for implementing desired image processing with respect to a two-dimensional image signal (hereinafter referred to simply as an image signal) acquired by the sensor head 12, and cables 16 enabling electrical communications between the sensor head 12 and the image processor 14, and which are capable of supplying power to the sensor head 12 from the image processor 14.

Further, the image processor 14 is connected electrically to an upper level controller 18, which is an external apparatus. The upper level controller 18 is constituted, for example, from a PLC (programmable logic controller), which sends various types of commands to the image processor 14, and controls driving of a conveyor 20 disposed underneath the sensor head 12.

The conveyor 20 comprises a cylindrical drive roller 21, a driven roller 22, and a band-shaped belt 24, which is trained between the drive roller 21 and the driven roller 22. The drive roller 21 is rotated in the direction of the solid line arrow (see FIG. 1) through operation of the upper level controller 18, such that simultaneously with movement of the belt 24 in the direction of the outline arrow (see FIG. 1), a workpiece (measurement object) 26 mounted on the conveyor 20 is transported in the direction of the outline arrow.

The sensor head 12 of the position measurement apparatus 10 is fixedly disposed above the conveyor 20 with an imaging surface 28 thereof being directed toward the side of the belt 24. At this time, an imaging region 30 of the sensor head 12 is set on a surface 32 of the workpiece 26, which is mounted on the conveyor 20.

Figure 2:
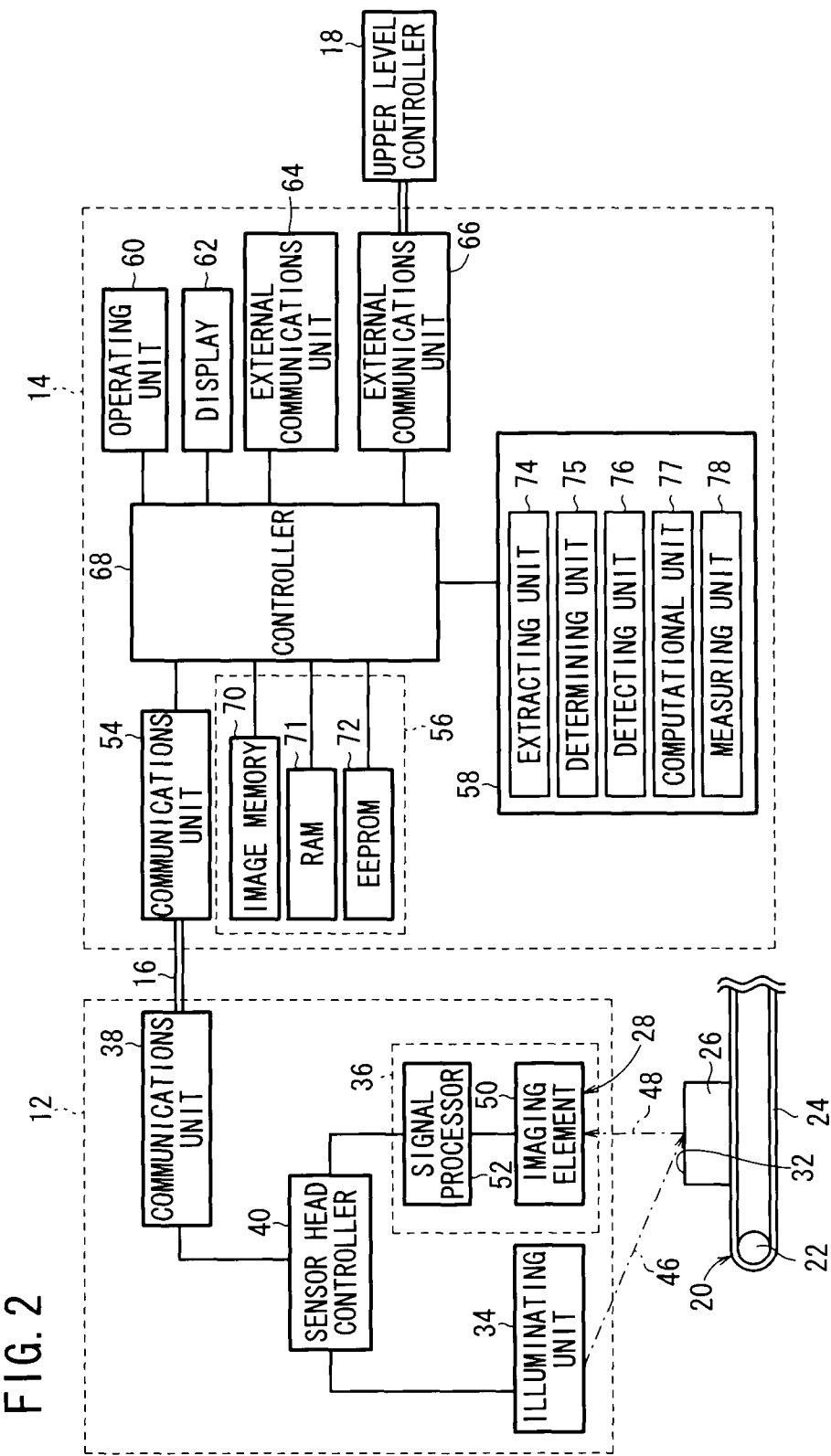
FIG. 2 is a functional block diagram of the position measurement apparatus according to the embodiment of the present invention.

Next, with reference to FIG. 2, which shows a functional control block of the position measurement apparatus 10 according to the present embodiment, explanations shall be given concerning the sensor head 12 and the image processor 14.

The sensor head 12 comprises an illuminating unit 34, an image capturing section 36, a communications unit 38, and a sensor head controller 40.

The illuminating unit 34 is constituted by a lamp that irradiates illuminating light 46 toward the imaging region 30 disposed on the surface 32 of the workpiece 26. The lamp can be turned on and off by a non-illustrated illumination switch.

The image capturing section 36 includes an image capturing element (image sensor) 50 for converting reflected light 48 (a reflected optical image of the workpiece 26) reflected by the surface 32 of the workpiece 26 and which is incident on the imaging surface 28 into an image capturing signal, and a signal processor 52 for amplifying the image capturing signal and outputting the same to the sensor head controller 40 in synchronism with timing control signals from the sensor head controller 40. The image capturing element 50, for example, may be constituted by a photodiode array, a CCD, a CMOS image capturing element, or the like.

A non-illustrated imaging optical system is disposed at an intervening position between the workpiece 26 and the image capturing element 50, which is capable of changing the dimension, i.e., the imaging magnification ratio, of the imaging region 30 that is irradiated onto the surface 32 of the workpiece 26. Further, by means of the imaging optical system, suitable optical path adjustments are performed so that image distortions do not occur in the image capturing signals acquired by the image capturing element 50.

In accordance with a command from the sensor head controller 40, the communications unit 38 carries out communications with the image processor 14. In this case, through use of LVDS (low voltage differential signaling), energy consumption can be suppressed, and high-speed signal transmissions that are robust or resistant to noise can be carried out.

The image processor 14 is equipped with a communications unit 54, a storage unit 56, an image processing unit 58, an operating unit 60, a display 62, an external communications unit 64, an external communications unit 66, and a controller 68.

The communications unit 54, following a command from the controller 68, carries out mutual communications with the sensor head 12. The storage unit 56 comprises an image memory 70 for storing image signals obtained from the sensor head 12, a RAM 71 for temporarily storing various parameters used for image processing and the like, and an EEPROM 72 for storing intrinsic data including an identification number of the sensor head 12, sensor sensitivity characteristics, etc.

The image processing unit 58 comprises an extracting unit 74, a determining unit 75, a detecting unit 76, a computational unit 77, and a measurement unit 78, which are constituted by software and hardware.

The operating unit 60 is constituted by switches and operating buttons, etc., not shown, which are used for making various different settings. The display 62 is constituted, for example, from an LCD panel, on which various numerical values or the like relating to measurement conditions and/or measurement results are displayed.

The two external communications units 64, 66 are provided to enable connections to external apparatus. For example, the external communications units 64, 66 can be connected to the upper level controller 18 to transmit/receive commands and various data with it, or connected to external personal computers (PC), not shown, or connected to another unillustrated image processor 14 for data communication. Such communications are not solely restricted to general communications standards such as USB 2.0, IEEE1394, RS-232C and the like, but can also utilize other communications standards unique to the image processor 14.

In FIG. 1 and FIG. 2, the image processor 14 is connected to the upper level controller 18 via the external communications unit 66.

The controller 68 carries out general comprehensive control of the entire image processor 14, including control functions for controlling the communications unit 54, the storage unit 56, the image processing unit 58, the operating unit 60, the display 62, and the external communications units 64, 66.

In the position measurement apparatus 10, the sensor head 12, and the image processor 14 shown in FIG. 1 are provided as separate individual units. Alternatively, the sensor head 12 and the image processor 14 may be constructed integrally. In that case, a condensed structure may be adopted for dispensing with the communications unit 38 and the communications unit 54.

The position measurement apparatus 10 according to the present embodiment basically is constructed as described above. Next, operations of the position measurement apparatus 10 shall be explained with reference to the flowchart shown in FIG. 4.

At first, after the workpiece 26, which serves as a measurement object, has been mounted on the conveyor 20, position and attitude adjustments of the sensor head 12 (see FIG. 1) of the position measurement apparatus 10 are carried out. As shown in FIG. 2, a user performs an ON/OFF operation of a non-illustrated illumination switch of the operating unit 60, so that a command for turning on and off the illuminating unit 34 is made with respect to the sensor head controller 40 through the operating unit 60, the controller 68, the communications unit 54, the cables 16, and the communications unit 38. Desired operations of the illuminating unit 34 are performed by on and off controls of the sensor head controller 40. Since illuminating light 46 from the illuminating unit 34 is irradiated toward the surface 32 of the workpiece 26, the position of the imaging region 30 can be confirmed while the user performs adjustments on the position and attitude of the sensor head 12.

Figure 3A:
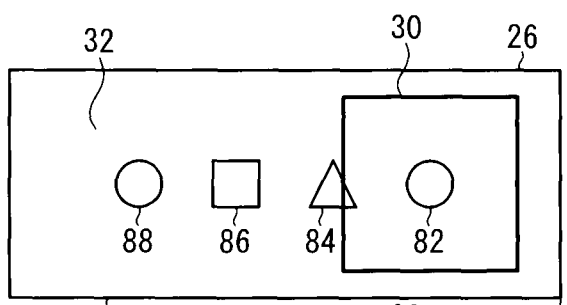
FIGS. 3A to 3C are outline front views showing a positional relationship between a measurement object and an imaging region.

As shown in FIG. 1 and FIGS. 3A through 3C, a circular groove 82, a triangular groove 84, a square groove 86, and another circular groove 88 are arranged in order from the right, or more specifically, from a downstream side of the transport direction according to the present embodiment, on the surface 32 of the workpiece 26. In FIG. 3A, a condition (initial condition) before the position measurement apparatus 10 performs measurement is shown. The circular groove 82 resides in a substantially center portion of the imaging region 30, whereas a part of the triangular groove 84 resides at the left side edge of the imaging region 30.

If patterns of contrasting density exist as images on the surface 32 of the workpiece 26, then the features of the present invention can still be applied even though specialized grooves such as those having three-dimensional shapes are not present.

As shown in FIG. 1, when the drive roller 21 is rotated in the direction of the arrow, the belt 24 is moved slidably in the direction of the outline arrow, and the workpiece 26, which is mounted on the belt 24 of the conveyor 20, also is transported in the direction of the outline arrow. By such a transporting operation of the workpiece 26, the positional relationship between the workpiece 26 and the imaging region 30 changes successively over time from the initial state shown in FIG. 3A to the states shown in FIG. 3B and FIG. 3C.

When carried out in this manner, while the surface 32 of the workpiece 26, which is larger than the imaging region 30, is moved relatively due to the transporting operation of the conveyor 20, images can be captured of each of the grooves (the circular groove 82, etc.) on the surface 32 of the workpiece 26 by the sensor head 12.

Figure 4:
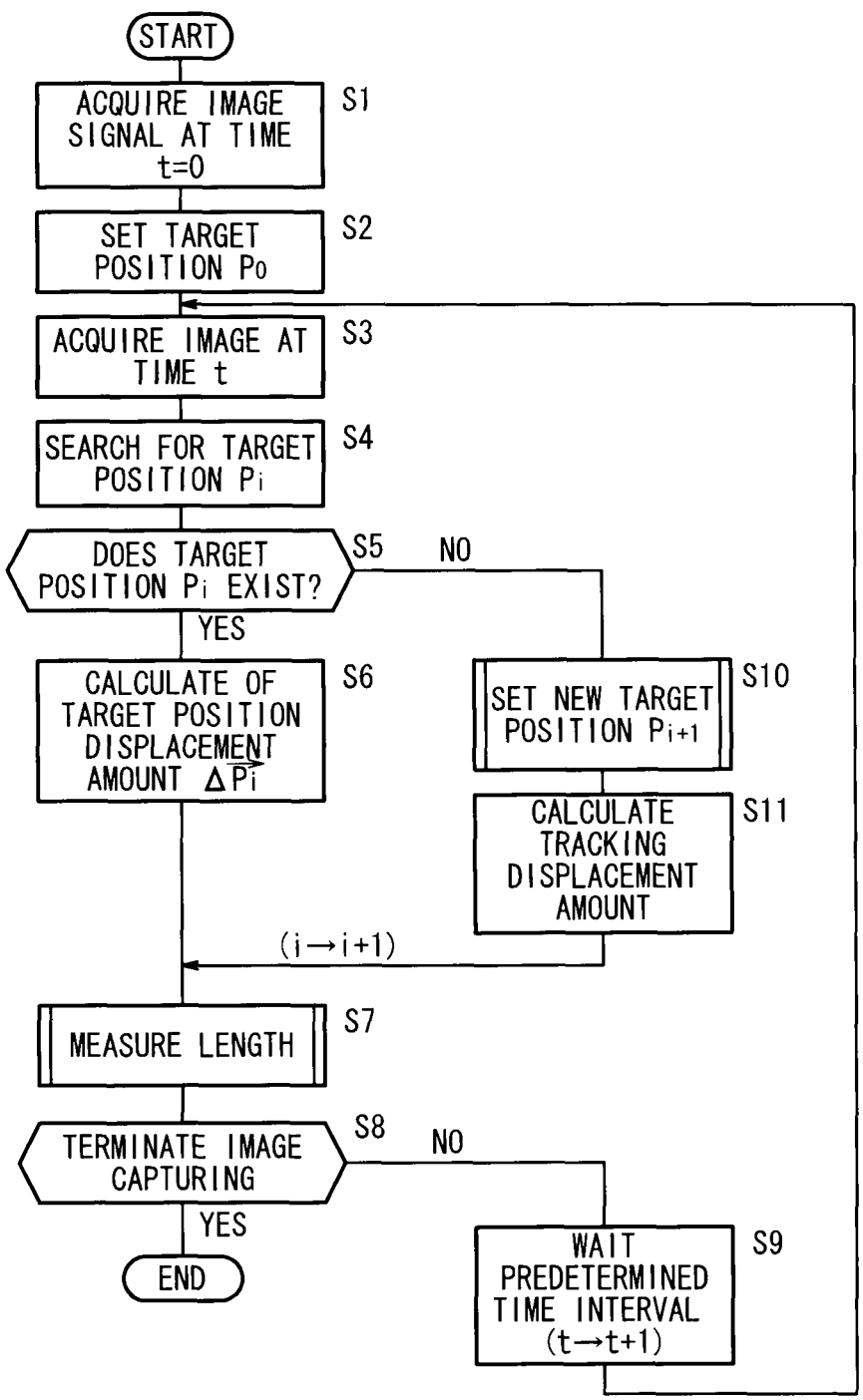
FIG. 4 is a flowchart for implementing a position measuring method according to an embodiment of the present invention.

Below, with reference to the flowchart shown in FIG. 4, detailed explanations shall be made concerning a measurement method for measuring a length of the workpiece 26 using the position measurement apparatus 10 according to the present embodiment.

[Step S1]

When a user presses a measurement initiating button (not shown) of the operating unit 60 shown in FIG. 2, a request to initiate image capturing is notified to the sensor head controller 40 via the operating unit 60, the controller 68, the communications unit 54, the cables 16, and the communications unit 38. Thereafter, the sensor head controller 40 emits an image capturing command to the image capturing section 36.

Initially, an image signal at a time t=0 is acquired (step S1). More specifically, an image signal is acquired showing an image I(0) inside the imaging region 30 at the time t=0.

In this case, reflected light 48 for forming a reflected optical image of the workpiece 26 is directed toward the imaging surface 28, and after appropriate optical path adjustments have been made in the non-illustrated imaging optical system, electro-optical conversion is carried out by the image capturing element 50 within the range of the imaging region 30, and an image signal is issued. The image signal is synchronized with timing control signals from the sensor head controller 40 and amplified, and the image signal is supplied to the sensor head controller 40. The image signal thereafter is supplied to the communications unit 38, and is stored in the image memory 70 through the cables 16, the communications unit 54, and the controller 68.

Figure 5A:
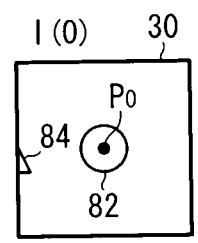
FIG. 5A is a schematic view showing an image inside the imaging region at a time t=0.
Figure 6A:
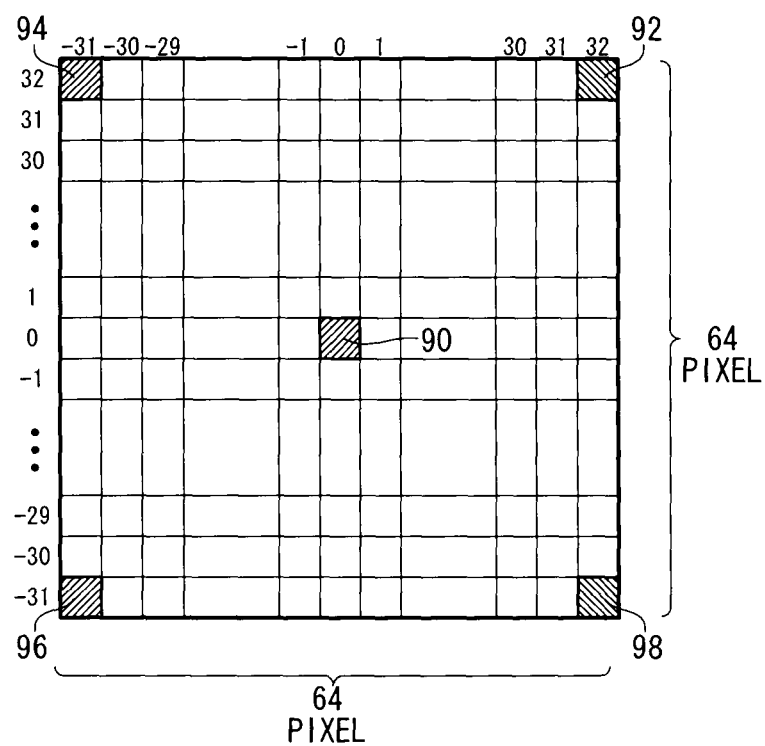
FIG. 6A is an explanatory diagram of an image signal representing an image inside the imaging region.

In this manner, as shown in FIG. 5A, an image I(0) inside the imaging region 30 is acquired (see also FIG. 3A). As shown in FIG. 6A, in the image signal representing the image I(0) inside the imaging region 30, the gradation number of each of the pixels (64 vertical, 64 horizontal) is made up of 256 gradations (8-bit). For convenience, the pixel number in the vertical direction shall be labeled from −31 to 32, and the pixel number in the horizontal direction also shall be labeled from −31 to 32, respectively.

[Step S2]

Next, a target position $P_0$ from the image I(0) inside the imaging region 30 is set (step S2).

Among the image signals stored in the image memory 70, an image signal (see FIG. 5A) is read out, which represents the image I(0) inside the imaging region 30, and the extracting unit 74 extracts the pattern on the surface of the workpiece 26 from inside the image I(0). According to the present embodiment, for specifying the position of the pattern extracted by the extracting unit 74, as a representative position, the center position of the circular groove 82 is determined and set as the target position $P_0$.

Figure 6B:
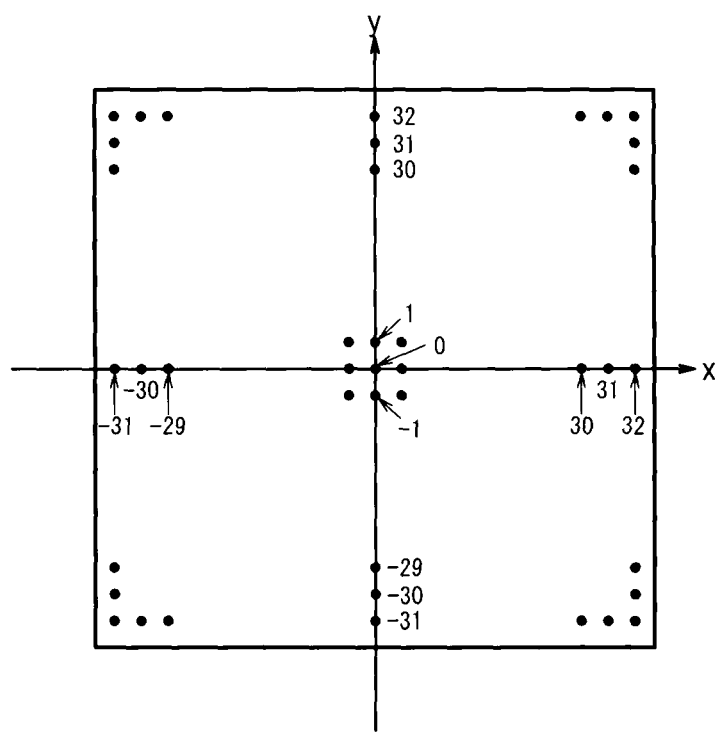
FIG. 6B is an explanatory diagram representing corresponding positions of each of pixels inside the imaging region.

For example, using a two-dimensional (x-y) coordinate system as shown in FIG. 6B, corresponding positions for each of the pixels inside the imaging region 30 are defined. The scale of the coordinate system is defined such that one graduation, in each of the x-axis and y-axis directions, corresponds in size to the pixel size (i.e., having dimensions equal to those of one pixel).

When defined in this manner, the two dimensional coordinates corresponding to the pixels 90, 92, 94, 96 and 98 shown in FIG. 6A are (0, 0), (32, 32), (−31, 32), (−31, −31) and (32, −31), respectively.

As shown in FIG. 5A, because at time t=0, the circular groove 82 resides substantially at the center position of the image I(0), the circular groove 82 is extracted as a pattern. At this time, as noted above, the target position $P_0$ is set at an origin (0, 0), which corresponds to the center position of the circular groove 82. Along therewith, the coordinates of the target position $P_0$ (0, 0) are stored in the storage unit 56 (e.g., RAM 71).

[Step S3]

Next, an image signal I(1) at a time t=1 is acquired (step S3). More specifically, an image signal is acquired showing an image I(1) inside the imaging region 30 at the time t=1.

At time t=1, the sensor head controller 40 emits an image capturing command with respect to the image capturing section 36, and an image signal that represents the newly captured image I(1) is stored in the image memory 70. These operations are essentially the same as those already described above, and therefore detailed explanations thereof have been omitted.

Figure 5B:
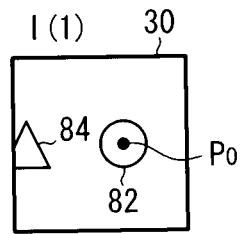
FIG. 5B is a schematic view showing an image inside the imaging region at a time t=1.

In this manner, the image I(1) inside the imaging region 30 is acquired, as shown in FIG. 5B. Although it is possible for the image capturing period Δt to be set at any optional value, in order to facilitate explanations, in the present specification, the image capturing period Δt is assumed to be 1. Further, it goes without saying that the present invention is applicable even in cases where the image capturing period Δt is not a constant value, or stated otherwise, when the time interval between successively captured images is irregular.

[Step S4]

Next, the target position $P_0$ from the image I(1) inside the imaging region 30 is sought (step S4).

Among the image signals stored in the image memory 70, an image signal (see FIG. 5B) is read out, which corresponds to the image I(1), and the detecting unit 76 detects the target pattern $P_0$ from inside the image I(1).

As a method for identifying a predetermined common position (or a common area) from among the two images I(1) and I(0), region-based matching, which is a well known technique, can be adopted.

Figure 7A:
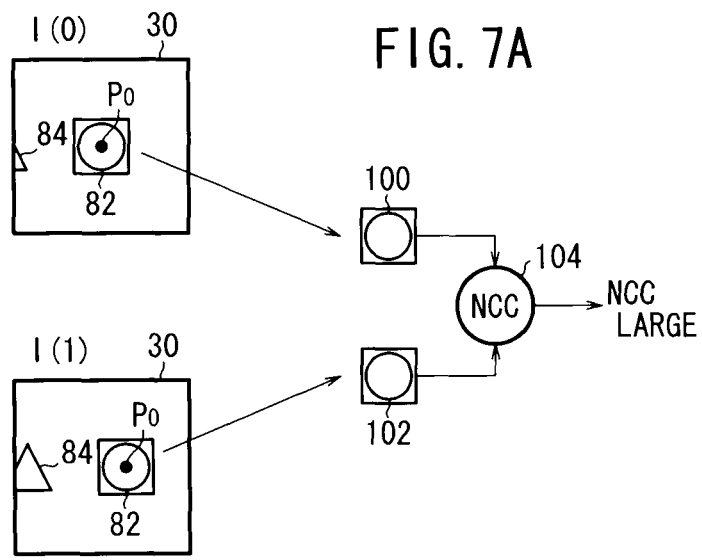
FIGS. 7A and 7B are schematic views showing examples of region-based matching.
Figure 7B:
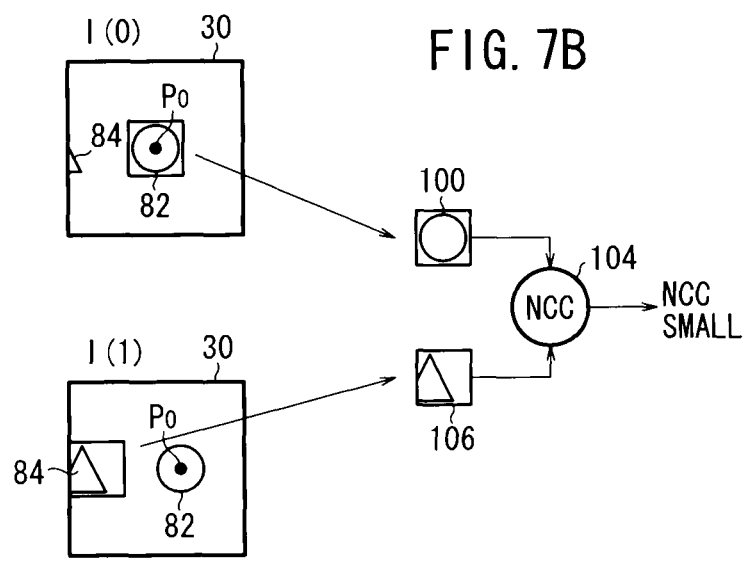

FIGS. 7A and 7B are schematic views showing examples of region-based matching.

As shown in FIG. 7A, a region of a predetermined size (e.g., a 16×16 pixel region), in which the target position $P_0$ is at the center of the image I(0), is extracted and stored beforehand as a template 100 in the storage unit 56 (e.g., RAM 71). On the other hand, a concerned region 102, in which an optional position (e.g., in FIG. 7A, a center right side of the imaging region 30) is taken as the center, is cut out from the image I(1) inside the imaging region 30. The pixel size (vertical and horizontal pixel number) of the concerned region 102 matches that of the template 100.

By causing an NCC (Normalized Cross Correlation) operator 104 to act on the template 100 and the concerned region 102, an NCC value is calculated, which serves as an index to indicate the degree of similarity between the two compared images. Since this technique is well known in the field of image processing, detailed explanations of this feature of the present invention shall be omitted.

In FIG. 7A, since the concerned region 102 closely resembles the template 100, a large NCC value is shown. On the other hand, in FIG. 7B, a concerned region 106, in which an optional position (e.g., in FIG. 7B, a center left end of the imaging region 30) of the image I(1) inside the imaging region 30 is taken as the center, is cut out, and since the concerned region 106 does not closely resemble the template 100, a small NCC value is shown.

In this manner, a center position of the concerned region 102, for which the NCC value from among the image I(1) inside the imaging region 30 is maximum, can be presumed to be the target position $P_0$ in the image I(1).

Figure 8A:
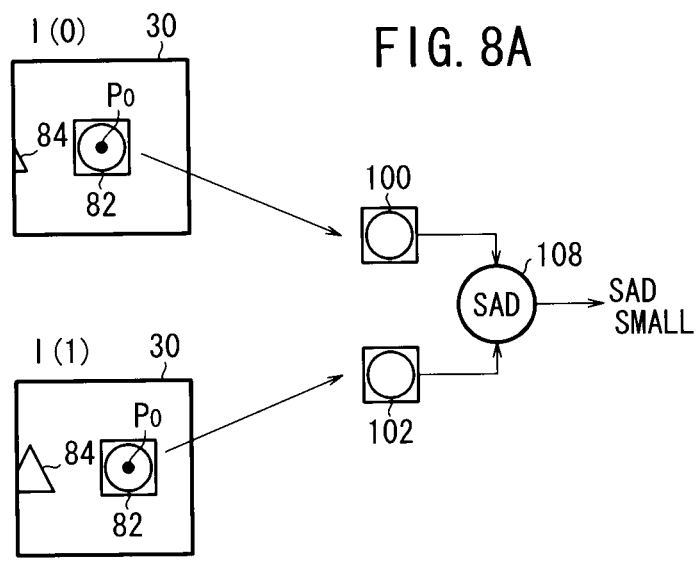
FIGS. 8A and 8B are schematic views showing other examples of region-based matching.
Figure 8B:
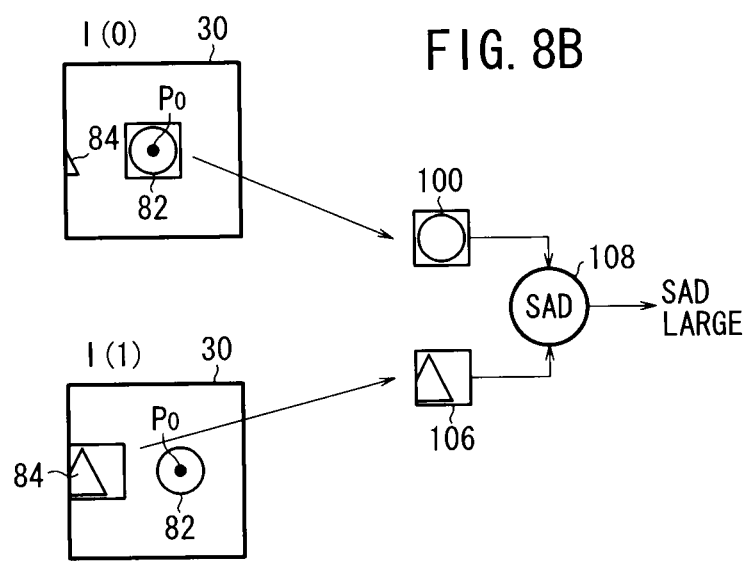

FIGS. 8A and 8B are schematic views showing other examples of region-based matching.

In FIGS. 8A and 8B, by causing a SAD (Sum of Absolute Difference) operator 108 to act on the template 100 and the concerned regions 102, 106, which have been cut out as noted above, a SAD value is calculated, which serves as an index to indicate the degree of difference between the two compared images. Since this technique is well known in the field of image processing, detailed explanations of this feature of the present invention shall be omitted.

In FIG. 8A, since the concerned region 102 closely resembles the template 100, a small SAD value is shown. On the other hand, in FIG. 8B, a concerned region 106, in which an optional position (e.g., in FIG. 8B, a center left end of the imaging region 30) of the image I(1) inside the imaging region 30 is taken as the center, is cut out, and since the concerned region 106 does not closely resemble the template 100, a large SAD value is shown.

In this manner, a center position of the concerned region 102, for which the SAD value from among the image I(1) inside the imaging region 30 is minimum, can be presumed to be the target position $P_0$ within the image I(1).

Figure 9:
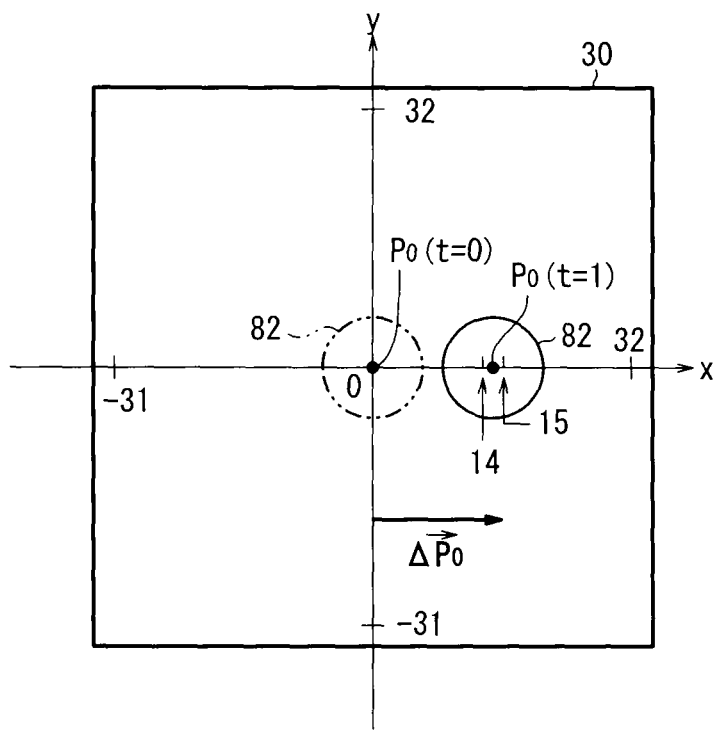
FIG. 9 is a schematic view showing a displacement amount of a target position from inside the imaging region.

FIG. 9 is a schematic view showing a displacement amount of a target position $P_0$ from inside the imaging region 30. When the search result for the position $P_0$ in step S4 is calculated, while the digits to the right of the decimal point are discarded, such that $P_0(t=0)=(0, 0)$ and $P_0(t=1)=(14, 0)$, the displacement amount of the target position $P_0$ becomes the vector value $\Delta P_0=(14, 0)$.

Because the image signal representing the image I(t) consists of discrete data, the coordinates of the target position $P_0$ can be expressed only by an integral multiple (in other words, an integer value) of the pixels. However, by utilizing sub-pixel estimation, coordinate values that exceed the pixel resolution can be expressed.

In this case, "sub-pixel estimation" implies a position estimating method in which rational numbers are introduced virtually when coordinates are expressed by discrete data. As a result, spatial resolution can be improved artificially, and quantization errors can be prevented from occurring.

Next, a detailed example concerning sub-pixel estimation shall be described. First, an NCC (or SAD) value is determined about a central position of each pixel of the image signal, and then a 3-pixel-by-3-pixel region in the vicinity of the maximum (or minimum) value thereof is extracted. A tendency (three pairs of data) of the NCC (or SAD) with respect to the x-axis is interpolated at a two-dimensional curve, and a position (rational number value of the pixel)

corresponding to the axis of the two-dimensional curve is calculated and determined as an x-axis coordinate of the target position $P_0$. Similarly, a tendency (three pairs of data) of the NCC (or SAD) with respect to the y-axis is interpolated at the two-dimensional curve, and a position (rational number value of the pixel) corresponding to the axis of the two-dimensional curve is calculated and determined as a y-axis coordinate of the target position $P_0$. In this manner, the x and y coordinates of the target position $P_0$ can be determined.

In the event that sub-pixel estimation is used, the search results of the target positions $P_0$ shown in FIG. 9 are $P_0(t=0) =(0,0)$ and $P_0(t=1)=(14.5,0)$, and the displacement amount of the target position $P_0$, with higher precision, becomes the vector value $\Delta P_O=(14.5, 0)$.

Further, sub-pixel estimation in the present embodiment is not limited to the aforementioned method, and various other types of methods could be adopted.

[Step S5]

Next, a judgment is performed to determine whether or not the position corresponding to the target position $P_0$ resides in the image I(1) inside the imaging region 30 (step S5). This judgment is carried out by the determining unit 75 (see FIG. 2) based on the search result of the target position $P_0$ in step S4.

For example, in the case that a portion is lacking from the pattern (circular groove 82) pertaining to the target position $P_0$ in the image I(1) inside the imaging region 30, when a search calculation by means of the aforementioned region-based matching is carried out, irrespective of whether the target position $P_0$ currently resides inside the imaging region 30, there is the possibility for the search to fail.

In such a case, a concern can be noted that the pattern (circular groove 82) extracted by the extracting unit 74 may miss the imaging region 30 when the next image is taken, which can be included in the judgment that the pattern does not reside in the image I(1) inside the imaging region 30 at the present time.

[Step S6]

In the case it is judged that the position corresponding to the target position $P_0$ resides in the image I(1) inside the imaging region 30, the vector $\Delta P_0$, which indicates the displacement amount of the target position $P_0$ from the image I(0) to the image I(1), is calculated (step S6), and the value thereof is stored in the storage unit 56 (e.g., RAM 71). This calculation is carried out by the computational unit 77 shown in FIG. 2.

[Step S7]

Next, the predetermined length on the surface 32 of the workpiece 26, which makes up the measurement object, is measured (step S7). Details of the method by which this step is performed will be explained later.

[Steps S8 to S9]

Next, an image capture ending judgment (step S8) is performed. In the case that image capturing is continued using the sensor head 12 without an image capture ending command being issued by means of a hardware or software interrupt, a predetermined time period is waited for until it becomes possible to acquire an image signal representing the image I(2) at the next time (t=2) (step S9).

From this point forward, image capturing is continued and steps S3 to S9 are repeated, so long as the position corresponding to the target position $P_0$ resides within the image I(t) inside the imaging region 30.

[Step S10]

Figure 3B:
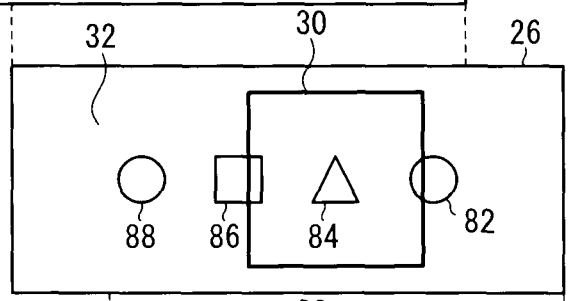
Figure 3C:
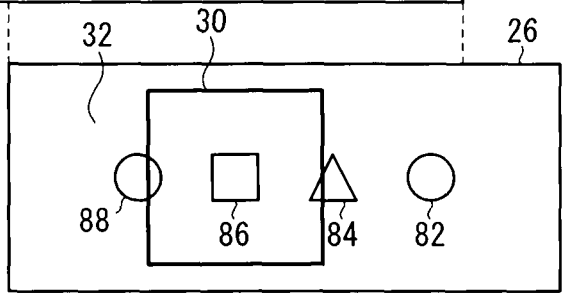

Thereafter, as shown in FIG. 3B, at a predetermined time t, in the case it is determined for the first time that the position corresponding to the target position $P_0$ does not reside in the Image I(t) inside the imaging region 30, a new target position $P_1$, which differs from the target position $P_0$, is set from the Image I(t) inside the imaging region 30 (step S10). As shown in FIG. 2, from among the image signals stored in the image memory 70, an image signal corresponding to the image I(0) is read out, and a new pattern on the surface 32 of the workpiece 26 is extracted from inside the image I(0) by the extracting unit 74. Similar to step S1, a target position $P_1$ is determined and set as a representative position of the new pattern extracted by the extracting unit 74, and along therewith, the coordinates of the new target position $P_1$ are stored in the storage unit 56 (e.g., RAM 71).

Figure 10:
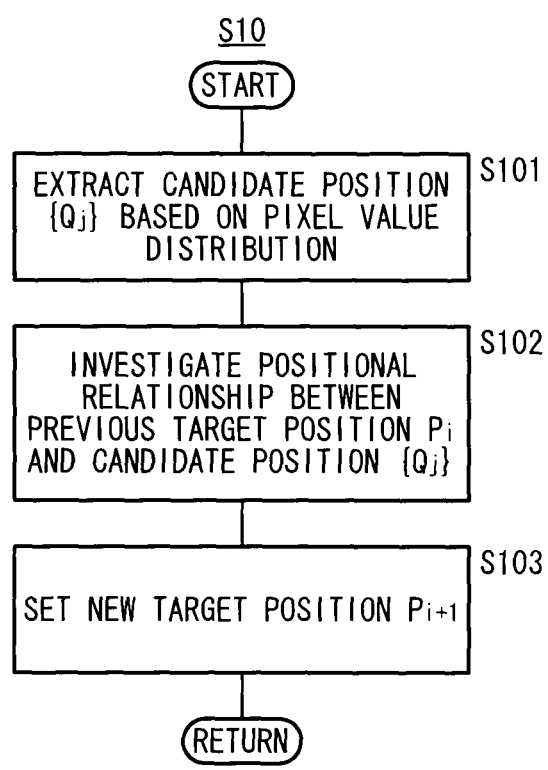
FIG. 10 is a flowchart relating to a method for setting a renewed target position from the image inside the imaging region.

Next, detailed explanations shall be given with reference to the flowchart of FIG. 10 concerning a method for setting the new target position $P_1$, which differs from the target position $P_0$, from the image I(t) inside the imaging region 30.

First, extraction of candidate positions is carried out based on the pixel value distribution (step S101).

In the case that the area in the neighborhood of the newly set target position $P_1$ possesses an average pixel value overall, searching for the target position $P_1$ (step S4 shown in FIG. 4) in the image I(t) inside the imaging region 30 would be extremely difficult. Consequently, a position where the possibility for searching is promising, i.e., in which the variance in pixel values of neighboring pixels is comparatively large, is extracted as a candidate position $\{Q_j\}$ for the target position $P_1$.

Herein, a case is considered in which a plurality of individual (M) candidate positions exists, and such a group of candidate positions is noted by $\{Q_j\}(j=1, 2, \ldots, M)$.

Figure 11:
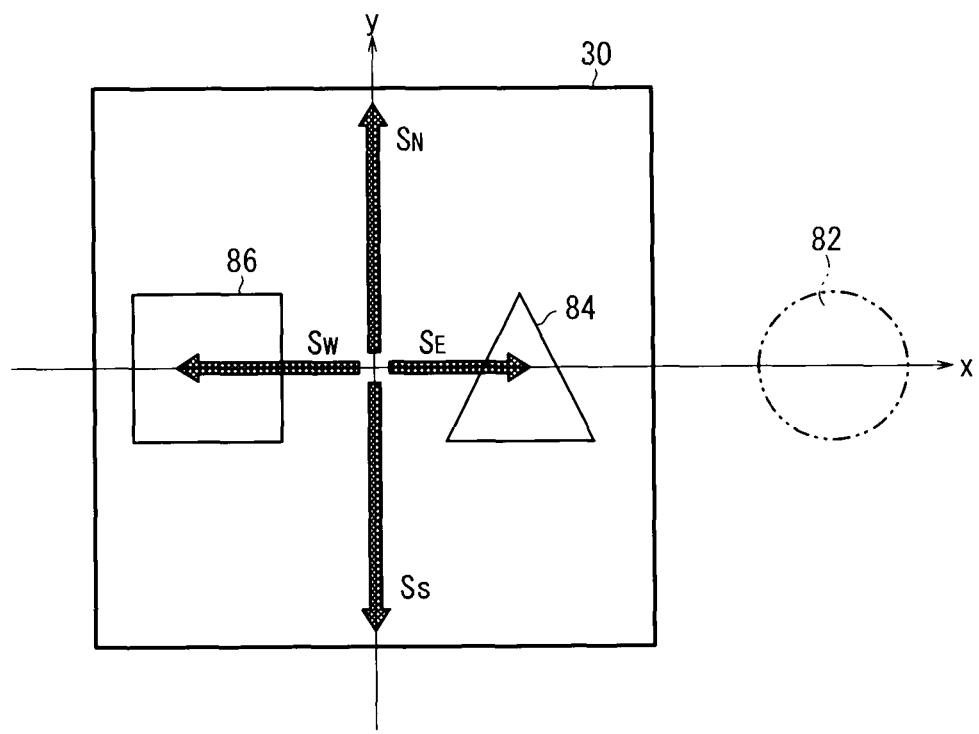
FIG. 11 is an explanatory diagram concerning a method for selecting candidate positions from inside the imaging region.

As shown in FIG. 11, taking the center pixel (0, 0) of the imaging region as a starting point, image characteristic values concerning each of pixels oriented in the directions of four arrows ($S_E$, $S_N$, $S_W$, $S_S$) are calculated successively, and the pixel for which the pixel characteristic value thereof exceeds for the first time a predetermined value is selected as a candidate position. In this case, the pixel characteristic value is defined as an evaluation value, which becomes larger accompanying an increase in the pixel value variance of neighboring pixels. For example, a standard deviation inside the concerned region (defined, as with the concerned region 102 and the like shown in FIG. 7), or a sum total of the difference in signal values between the pixel values and the average value thereof within the concerned region, or the like, can be used as the pixel characteristic value.

Since the triangular groove 84 resides in the direction of the $S_E$ arrow, whereas the square groove 86 resides in the direction of the $S_W$ arrow, a barycentric (center of gravity) position therebetween is selected as the candidate position. On the other hand, with respect to the direction of the arrow $S_N$ and the arrow $S_S$ from the center pixel (0, 0), because the pixel values up to the vicinity of the border of the imaging region 30, for which pixel characteristic values concerning each of the pixels are calculated, are uniform, calculations are completed, concluding that the candidate position $\{Q_j\}$ does not reside therein.

If the above-described method is adopted, compared to the case of calculating pixel characteristic values with respect to all of the pixels inside the imaging region, the arithmetic operational amount required for processing can be dramatically reduced. Carried out in this manner, a maximum of four (two as shown in FIG. 11) candidate positions $\{Q_j\}$ are extracted.

Next, the positional relationship between the previous target position $P_0$ and the candidate positions $\{Q_j\}$ is investigated (step S102).

It is essential that the previous position $P_0$ and the target position $P_1$ set at the current time exist together within at least one image I(t) inside the imaging region 30. Otherwise, the mutual positional relationship between the target position $P_0$ and the target position $P_1$ cannot be identified. Therefore, with respect to all of the candidate positions $\{Q_j\}$ extracted in step S101, it is first investigated whether or not the target position $P_0$ and the candidate position $\{Q_j\}$ CO both exist together within at least one image I(t) inside the imaging region 30.

Making use of the fact that the target position $P_0$ definitely exists within the image I(t−1) inside the imaging region 30, a method can be adopted to determine whether or not the candidate position $\{Q_j\}$ also exists within the image I(t−1) inside the imaging region 30. In this case, the region-based matching technique, which was described above, can be used.

Lastly, one position from among the candidate positions $\{Q_j\}$ is selected, and the new target position $P_1$ is set at the aforementioned one position (step S103). For example, in the case that one individual candidate position $\{Q_j\}$ resides in the image I(t−1) inside the imaging region 30, the target position $P_1$ is set at the candidate position. In the case that a plurality of individual candidate positions $\{Q_j\}$ reside in the image I(t−1) inside the imaging region 30, the target position $P_1$ is set at one candidate position for which the image characteristic value thereof is maximum from among the plurality of candidate positions $\{Q_j\}$.

In this manner, a new target position $P_1$, which differs from the target position $P_0$, can be set from the image I(t) inside the imaging region 30.

Step S11

Next, a vector $P_0P_1$, which is a tracking displacement amount of the target position $P_0$, is calculated (step S11). This calculation is performed in the computational unit 77 shown in FIG. 2.

According to the present embodiment, because the target position $P_1$ is set such that the target positions $P_0$ and $P_1$ both reside in the image I(t−1) inside the imaging region 30, the vector $P_0P_1$ can easily be determined. In this manner, by performing steps S10 and S11, the new target position $P_1$ (general equation: $P_{i+1}$) is set with respect to the current target position $P_0$ (general equation: $P_i$).

Next, a judgment to terminate image capturing is performed (step S8). At the current time, in the case that image capturing is to continue without a command to terminate the same, a predetermined time is maintained until a next time (t+1) during which acquisition of the image I(t+1) from inside the imaging region 30 is enabled (step S9).

[Detailed Description of Step S7]

Figure 12:
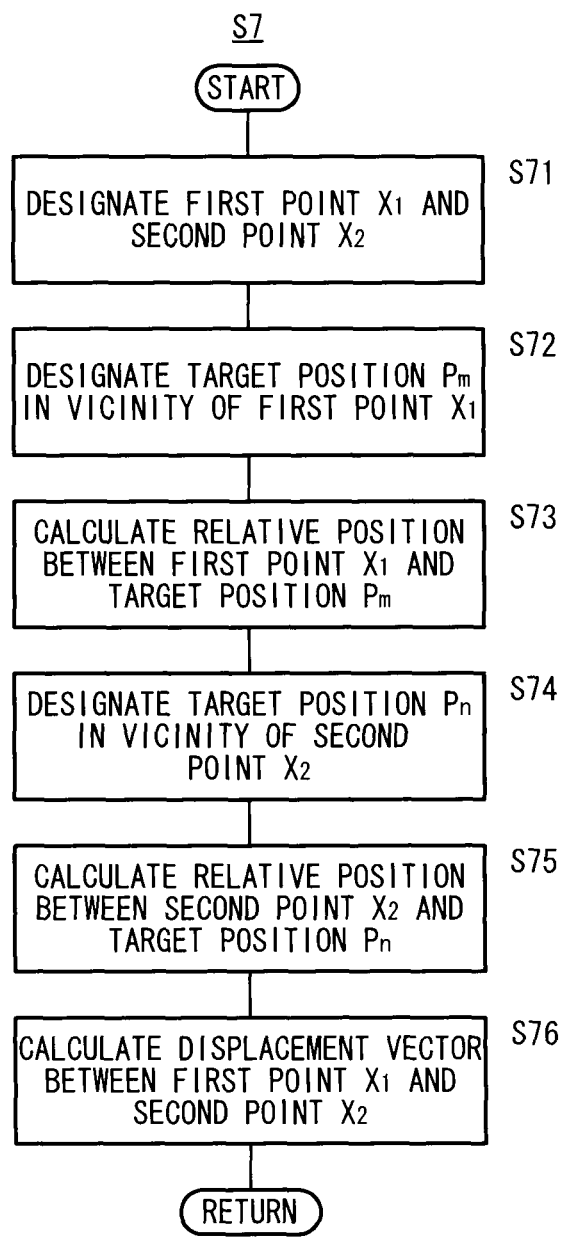
FIG. 12 is a flow chart relating to a method for measuring the length of the measurement object.

As discussed above, while image capturing is being conducted, that is in real time, a predetermined length is measured on the surface 32 of the workpiece 26, which serves as the measurement object (step S7). Below, with reference to the flowchart shown in FIG. 12, the measurement method shall be described in greater detail.

Figure 13:
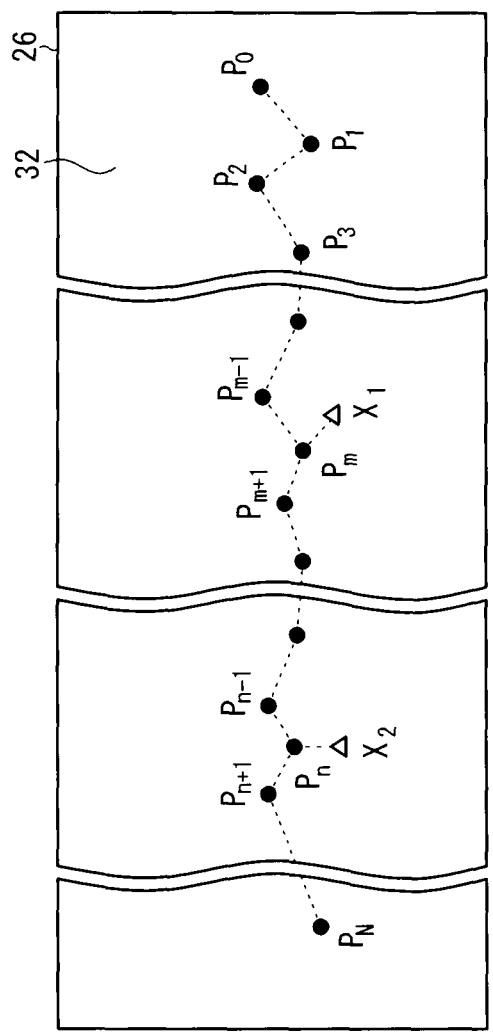
FIG. 13 is an outline front view representing a positional relationship of a target position set on a front surface of the measurement object.

Using the position measuring method according to the present embodiment, (N+1) individual target positions (N is a positive integer), or more specifically, positions $P_0$ to $P_N$ are set on the surface 32 of the workpiece 26 (see FIG. 13). Data of the tracking displacement amount vector $\{P_iP_{i+1}\}$ stored in the RAM 71 shown in FIG. 2 is read out, and based on such data, length measurement is performed by the measurement unit 78.

First, a first point $X_1$ defining a length measurement starting point and a second point defining a length measurement end point are designated (step S71). As one example of designating such points, referring to the image displayed on the display 62 shown in FIG. 2, the user, by a setting means such as a GUI or the like, can set the first point $X_1$ and the second point $X_2$. Further, a marker for enabling discrimination of the starting point and end point on the surface 32 of the workpiece 26 may be implemented. The user, prior to initiation of length measurement, normally sets beforehand the first point $X_1$ as the starting point of the length measurement.

Next, a target position $P_m$ (0≤m≤N) is determined in the vicinity of the first point $X_1$ (step S72). Herein, in at least one image I(t) inside the imaging region 30, it is necessary for the first point $X_1$ and the target position $P_m$ both to exist. Assuming there is a target position $P_m$ that fulfills this condition, any position may be selected.

Next, a vector $X_1P_m$ defining the relative position between the first point $X_1$ and the target position $P_m$ is calculated (step S73). Since the first point $X_1$ and the target position $P_m$ both reside within the region represented by the image $I(t_1)$ inside the imaging region 30 at the predetermined time $t_1$, the vector $X_1P_m$ can easily be determined.

Next, a target position $P_n$ (0≤m<n≤N) in the vicinity of the second point $X_2$ is determined (step S74). Herein, in at least one image I(t) inside the imaging region 30, it is necessary for the second point $X_2$ and the target position $P_n$, both to exist. Assuming there is a target position $P_n$, that fulfills this condition, any position may be selected.

Next, a vector $X_2P_n$ defining the relative position between the second point $X_2$ and the target position $P_n$ is calculated (step S75). Since the second point $X_2$ and the target position $P_n$ both reside within the region represented by the image $I(t_2)$ inside the imaging region 30 at the predetermined time $t_2$, the vector $X_2P_n$ can easily be determined.

Lastly, a displacement vector between the first point $X_1$ and the second point $X_2$ is calculated (step S76). The displacement vector $X_1X_2$ is determined by the following equation (1).

$$\overrightarrow{X_1X_2} = \overrightarrow{X_1P_m} + \overrightarrow{P_mP_{m+1}} + \ldots + \overrightarrow{P_{n-1}P_n} + \overrightarrow{P_nX_2} \quad (1)$$

$$= \overrightarrow{X_1P_m} + \sum_{i=m}^{n-1} \overrightarrow{P_iP_{i+1}} + \overrightarrow{P_nX_2}$$

$$(0 \leq m < n \leq N)$$

In this manner, the target position $\{P_i\}$, which is a representative position of the pattern extracted by the extracting unit 74 (FIG. 2), functions as a tracking point. As a result, an optional position inside the image in which at least one target position exists can be expressed by the above equation (1).

Lastly, by multiplying the image size (the dimension of 1 pixel) with respect to the x-axis displacement amount and the y-axis displacement amount that define units of the pixel number, the length in actual dimensions can be determined. Further, the pixel size can be calculated based on the image capturing magnification ratio (which is set in the non-illustrated imaging optical system), and the resolution of the image capturing element 50, which is known.

Moreover, prior to measuring the length, by taking an image of a high precision reference target object (the size of which is already known), measuring the pixel number, and dividing the pixel number from the known size, the pixel size can be determined.

Further, if the position of the first point $X_1$, which is the measurement starting position, is set beforehand, the aforementioned position measuring method can still be realized, even with a configuration in which only the image signal representing the image I(t) necessary to specify the target position {$P_i$} may be stored in the image memory 70 of the storage unit 56, and an image signal representing the other image I(t) thereof is not stored (i.e., the other image I(t) is destroyed after predetermined image processing performed thereon). In this case, a favorable condition exists in that the memory capacity of the storage unit 56 can be reduced, as well as reducing the number of times that the memory is accessed.

The position measurement apparatus and positioning measuring method according to the present invention are not limited to the embodiments described above, and various alternative or additional features and structures may be adopted without deviating from the essence and scope of the invention.

For example, although in the present embodiment a structure is adopted in which illuminating light 46 is reflected from the surface 32 of the workpiece 26 and a reflected optical image therefrom is captured by the image capturing element 50, natural light may also be used, or an optical image emitted from the measurement object itself can be captured by the image capturing element 50.

Further, the image capturing element 50 can be constructed from a monochrome sensor (i.e., a sensor element having a single light reception wavelength characteristic) or a color sensor (i.e., a sensor element having a multiple-type light reception wavelength characteristic). In this case, the image processor 14 can perform communications and image processing appropriate to the data type of the acquired image signals.

Furthermore, although in the present embodiment a case has been shown in which the position and attitude of the sensor head 12 are fixed, and the workpiece 26 mounted on the conveyor 20 is moved by being transported on the conveyor 20, the means for causing relative movement of the sensor head 12 above the surface 32 of the workpiece 26 is not limited to this case. For example, image capturing may also be carried out by moving the sensor head 12 in parallel with respect to the surface 32 of the workpiece 26 while the workpiece 26 remains fixed in position. Further, the measurement object itself may include a driving mechanism, whereby an image is captured of the moving measurement object.

Further, assuming a configuration in which known conventional image recognition processing techniques are incorporated in the image processing unit 58, not only two dimensional length measurements, but shape discrimination and color discrimination processes can also be performed.

Further, in the position measurement apparatus and position measuring method according to the present invention, not only two dimensional coordinates (X, Y), but also three dimensional coordinates (X, Y, Z), can be applied. In this case, displacements in the z-axis direction can be realized by detecting an enlargement/reduction ratio of the patterns.

Furthermore, if position measurements are made at two optional points, the length, three dimensional displacement, and angle (angular displacement about a third position) thereof can be uniquely determined. Accordingly, the position measurement apparatus and position measuring method according to the present invention not only serves as a length measurement sensor and a displacement sensor, but can also be applied as an angle sensor, a velocity sensor, or the like.

What is claimed is:

1. A position measurement apparatus in which an image capturing element having an imaging region of a dimension smaller than that of a measurement object is moved relatively over a surface of the measurement object while an image on the surface of the measurement object is captured to obtain an image inside the imaging region, and a position on the surface of the measurement object is measured using the obtained image inside the imaging region, comprising:

an extracting unit for extracting a pattern on the surface of the measurement object from the image inside the imaging region at a predetermined point in time;

a detector for detecting a displacement amount of the pattern extracted by the extracting unit occurring in the image inside the imaging region at a point in time after the predetermined point in time;

a measurement unit for measuring the position on the surface of the measurement object based on the dimension and the displacement amount detected by the detector; and a storage unit for storing position information concerning the pattern extracted by the extracting unit, wherein the extracting unit extracts a renewed pattern on the surface of the measurement object, which differs from the pattern, from the image inside the imaging region in which the pattern exists, the storage unit stores a tracking displacement amount, which is a vector from a position of the pattern to a position of the renewed pattern, each time the renewed pattern is extracted, the measurement unit further measures the position on the surface of the measurement object based on each of a plurality of tracking displacement amounts stored in the storage unit, and the measurement unit measures the position on the surface of the measurement object based on the displacement amount, the dimension, and the position information stored by the storage unit.

2. The position measurement apparatus according to claim 1, further comprising a determining unit for carrying out a determination as to whether or not the pattern extracted by the extracting unit exists in the image inside the imaging region at present time, wherein, when it is determined by the determining unit that the pattern does not exist in the image inside the imaging region at the present time, the extracting unit extracts the renewed pattern from the image inside the imaging region at the present time.

3. The position measurement apparatus according to claim 1, wherein:

the storage unit stores a template of the pattern; and the detector calculates the displacement amount of the pattern based on region-based matching using the template stored by the storage unit.

4. The position measurement apparatus according to claim 1, wherein the detector detects the displacement amount by utilizing sub-pixel estimation.

5. The position measurement apparatus according to claim 1, wherein the extracting unit extracts, as the renewed pattern, a pattern that is different from the pattern and has neighboring pixels having a pixel variance exceeding a predetermined value.

6. The position measurement apparatus according to claim 1, further comprising a determining unit for determining whether the pattern extracted by the extracting unit exists in the image inside the imaging region at present, wherein the extracting unit extracts the renewed pattern from an image that comes right before the image used by the determining unit when the determining unit determines that the pattern extracted by the extracting unit does not exist in the image.

7. The position measurement apparatus according to claim 1, wherein a length on the surface of the measurement object includes a position other than the position information concerning the pattern on the surface of the measurement object extracted by the extracting unit.

8. The position measurement apparatus according to claim 7, wherein the length is a total length of the measurement object.

9. The position measurement apparatus according to claim 7, wherein the length on the surface of the measurement object includes a position specified by a user.

10. The position measurement apparatus according to claim 7, wherein the length is defined by at least two points specified by a user.

11. A position measuring method in which an image capturing element having an imaging region of a dimension smaller than that of a measurement object is moved relatively over a surface of the measurement object while an image on the surface of the measurement object is captured to obtain an image inside the imaging region, and a position on the surface of the measurement object is measured using the obtained image inside the imaging region, the method comprising the steps of:

extracting a pattern on the surface of the measurement object from the image inside the imaging region at a predetermined point in time;

detecting a displacement amount of the pattern extracted by an extracting unit occurring in the image inside the imaging region at a point in time after the predetermined point in time;

measuring the position on the surface of the measurement object based on the dimension and the displacement amount detected by a detector;

storing by a storage unit position information concerning the pattern extracted by the extracting unit;

extracting a renewed pattern on the surface of the measurement object, which differs from the pattern, from the image inside the imaging region in which the pattern exists;

storing by the storage unit a tracking displacement amount, which is a vector from a position of the pattern to a position of the renewed pattern, each time the renewed pattern is extracted, wherein measuring the position on the surface of the measurement object includes measuring the position on the surface of the measurement object based on each of a plurality of tracking displacements amounts stored in the storage unit, and measuring the position on the surface of the measurement object based on the displacement amount, the dimension, and the position information stored by the storage unit.

12. The position measuring method according to claim 11, wherein, after the detecting step is performed, further comprising a determining step for determining by a determining unit whether or not the pattern extracted by the extracting unit exists in the image inside the imaging region at present time.

13. The position measuring method according to claim 11, wherein a length on the surface of the measurement object includes a position other than the position information concerning the pattern on the surface of the measurement object extracted.

14. The position measuring method according to claim 13, wherein the length is a total length of the measurement object.

15. The position measuring method according to claim 13, wherein the length on the surface of the measurement object includes a position specified by a user.

16. The position measuring method according to claim 13, wherein the length is defined by at least two points specified by a user.

\* \* \* \* \*